May 28, 1968     V. C. H. RICHARDSON     3,385,204

FOOD COOKING MACHINE

Filed Aug. 4, 1966     3 Sheets-Sheet 1

INVENTOR.
VERNON C. H. RICHARDSON
BY Charles E. Lightfoot
ATTORNEY

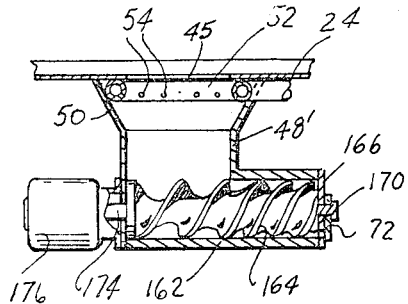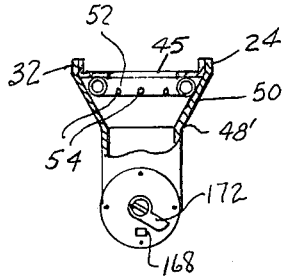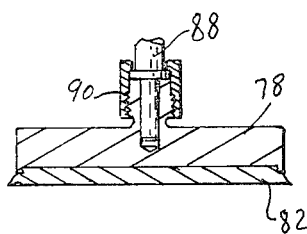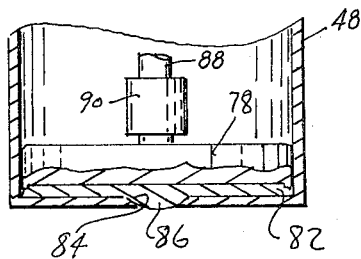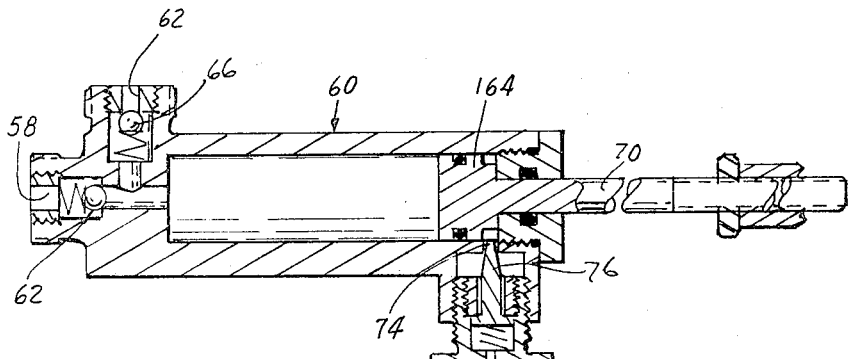

May 28, 1968  V. C. H. RICHARDSON  3,385,204
FOOD COOKING MACHINE
Filed Aug. 4, 1966  3 Sheets-Sheet 3

INVENTOR.
VERNON C.H. RICHARDSON
BY Charles E. Lightfoot
ATTORNEY

# United States Patent Office 3,385,204
Patented May 28, 1968

3,385,204
FOOD COOKING MACHINE
Vernon C. H. Richardson, Houston, Tex.
(5312 Brae Burn, Bellaire, Tex. 77401)
Filed Aug. 4, 1966, Ser. No. 570,196
3 Claims. (Cl. 99—404)

ABSTRACT OF THE DISCLOSURE

A machine for mixing particulate food material with water to form an extrudable paste which is then extruded and cut into pieces which are cooked and delivered in a freshly cooked condition. The apparatus includes means for introducing liquid into particulate food material during the introduction of the material into the extruding mechanism, whereby a paste-like mass of uniform consistency is formed which may be readily extruded.

---

This invention relates to the cooking of food, and more particularly to a machine for preparing a food product from a preformed mixture of ingredients and cooking and delivering the same in a freshly cooked condition.

The invention is capable of use for the preparation and delivery in a freshly cooked condition of a variety of different kinds of food products, and finds particular utility in connection with the preparation of fried or baked products, such as French fried potatoes, or other articles of food, which are usually provided in pieces or portions of more or less uniform size and shape.

The invention has for an important object the provision of a machine for preparing and cooking food which is designed for automatic operation to prepare articles of food from a preformed mixture of ingredients and to cook and deliver the same in a freshly cooked condition.

Another object of the invention is to provide a food preparing and cooking machine in which a preformed mixture of ingredients may be stored in a dry condition and by which such material may be combined in predetermined proportions with suitable liquid formed into portions and cooked and delivered in a freshly cooked condition.

A further object of the invention is the provision of a food preparing and cooking machine of the kind mentioned, by which the articles of food are prepared only at the time and in such quantity as needed for immediate consumption.

A still further object of the invention is to provide a machine for preparing, cooking and delivering a freshly cooked article of food and which is of simple design and rugged construction, easily maintained in a sanitary condition and which may be operated unattended for long periods of time.

Briefly described, the invention comprises a food preparing and cooking machine constructed as an automatically operating unit having means for separately storing a preformed mixture of food ingredients in a dry particulate condition and a liquid to be combined therewith, mechanism for dispensing and combining the premixed materials and liquid in predetermined proportions and for forming the combined mass into pieces or portions of predetermined size and shape, and means for cooking and delivering the cooked articles in a freshly cooked condition.

The above and other incidental objects and advantages of the invention will be apparent from a consideration of the following detailed description, constituting a specification of the invention, reference being had to the annexed drawings, wherein:

FIGURE 3 is a fragmentary side elevational view, partly broken away and partly in cross-section, showing details of structure of one form of extruder mechanism of the invention;

FIGURE 4 is an end elevational view, partly broken away and partly in cross-section looking at the right end of the extruder mechanism as shown in FIGURE 3;

FIGURE 5 is a fragmentary side elevational view, partly in cross-section and on an enlarged scale, showing the plunger structure of a preferred form of extruder mechanism of the invention, separated from the surrounding parts of the mechanism;

FIGURE 6 is a view similar to that of FIGURE 5, showing the plunger of the extruder mechanism in the cylinder of the same and at the extreme position in the extruding direction of the movement of the piston;

FIGURE 7 is a longitudinal, central, cross-sectional view, on an enlarged scale of a preferred form of liquid dispensing mechanism of the invention;

Figure 11:
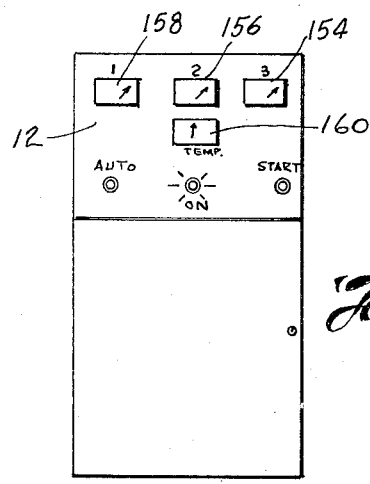
FIGURE 11 is a front elevational view of a preferred form of the instrument and control panel of the invention.

Referring now to the drawings in greater detail the mechanism of the invention is enclosed in a suitable housing, generally designated 10, which may be of any convenient construction, preferably rectangular and having one or more sides which may be removed for convenient access to the mechanism in the interior. The housing has on one wall thereof an instrument and control panel shown at 12 in FIGURE 1, and in greater detail in FIGURE 11.

Within the upper portion of the housing a material storage and dispensing hopper 14 is located, which may be filled from the top and whose bottom is provided with a discharge outlet 16.

A storage reservoir or liquid dispensing tank 18 is also disposed within the upper portion of the housing, which tank may also be filled from the top, and which is provided with an outlet pipe 20, at the bottom, through which liquid may be dispensed from the tank.

Beneath the hopper and tank a horizontal slideway or trackway 22 is supported in the tank, and spaced vertically below the trackway 22 a horizontal slideway 24 is disposed.

Within the bottom of the housing the cooking and delivering mechanism is located, which is generally designed 28, and above the cooking mechanism the housing is provided with an internal, horizontal wall 30 which separates the same into a lower cooking compartment and an upper material storage and food mixing compartment.

Figure 2:
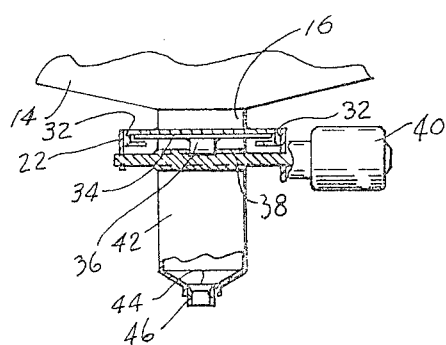
FIGURE 2 is a cross-sectional view, partly broken away and on an enlarged scale, taken along the line 2—2 of FIGURE 1, looking in the direction indicated by the arrows.

The trackway 22 may be of a type having spaced apart, parallel tracks 32, which in the present illustration are of angle shape in cross-section, as best seen in FIGURE 2, upon which an elongated plate-like slide 34 is longitudinally slidable, the slide being provided on its lower face with an elongated rack 36 with which a pinion 38, rotatably carried on the trackway, is engaged, which is rotated by a motor 40 to move the slide along the trackway.

A food material dispensing receiver 42, which may be of tubular shape, open at its upper end, is carried by the slide 34, extending downwardly between the tracks 32 and having a discharge opening 44 at its lower end, which is provided with a tubular spout 46, formed of suitable seal forming material, such as Teflon, or the like, whose lower end is slidingly engaged with the slideway 30, to close the receiver against the outflow of material through the discharge opening. The receiver opens upwardly at its upper end through the slide 34 so that material from the hopper 14 may flow downwardly into the receiver when the receiver is moved to a position beneath the outlet 16, and upon movement of the receiver away from the outlet the outlet will be closed by the slide.

The slideway 30 is preferably of plate-like formation, whose upper face is positioned to close the lower end of the receiver against the outflow of material therefrom. The slideway 30 has an opening 46 therethrough, which opens into the upper end of an extruder cylinder 48 removably supported on the slideway and extending vertically downwardly therefrom. The opening 46 is located to be in registry with the lower end outlet 44 of the receiver 42 when the receiver is over the extruder cylinder to allow the downward outflow of material from the receiver into the cylinder.

The extruder cylinder 48 is formed with an enlarged or outwardly flared upper end portion 50 within which an annular liquid spray pipe or ring 52 is located, which ring has a number of peripherally spaced inwardly directed discharge openings 54 therein, which are of a size to form a spray of liquid discharged therethrough into the extruder cylinder and are preferably directed somewhat angularly downwardly and radially inwardly of the cylinder, as best seen in FIGURES 3 and 4. The spray ring 52 is connected by a supply pipe 56 with the outlet port 58 of a liquid supply cylinder or pump, generally designated 60, such as that shown in detail in FIGURE 7, whose inlet port 62 is connected to the outlet pipe 20 through which liquid is supplied thereto from the liquid reservoir 18. The liquid supply cylinder has a piston 64 therein and is provided with an inwardly opening check valve 66 for the inlet port 62 and an outwardly opening check valve 68 for the outlet port 58. The piston 64 has a piston rod 70 which is operated by a solenoid device 72, or other suitable means to move the piston in the cylinder, and which may be adjusted in any suitable manner to adjust the length of the stroke of the piston, whereby the amount of liquid supplied to the spray ring for each piston stroke may be controlled.

The cylinder 60 may have a relief port 74 at the end of the cylinder opposite the inlet and outlet ports, which is controlled by an adjustable valve 76 which may be adjusted to regulate the inflow of air into the cylinder, whereby the rate of movement of the piston therein toward the inlet and outlet ports may be controlled to regulate the time during which the liquid is sprayed into the extruder cylinder 48.

A plunger 78 is provided for the extruder cylinder 48, which plunger is operated by a pressure cylinder 80 supported at a location above the upper end of the extruder cylinder. The cylinder 80 may be connected to any suitable source of pressure, not shown, and may be of a usual type adapted for operation under the control of suitable mechanism, not shown, to advance and retract the plunger 78. The plunger 78 is positioned for downward movement into the upper end of the extruder cylinder, through the spray ring 52 and is provided with suitable seal forming means 82 which forms a tight seal between the plunger and the surrounding inner surface of the cylinder, which is wiped by the seal forming means. The cylinder 48 has a central opening 84 in its lower end through which material in the cylinder is extruded as the piston 78 moves downwardly therein, and the seal forming means 82 of the piston is shaped and positioned to enter the opening 84 as seen at 86 to clear the same of such material when the piston reaches the bottom of the cylinder. By this arrangement the cylinder is cleaned of the material which is being extruded and the opening 84 is cleared so that substantially no unused material is left in the cylinder after an extruding operation of the mechanism. The plunger 78 is removably connected to its rod 88, as shown at 90 in FIGURE 5, so that the plunger may be readily removed for purposes of cleaning the same.

Suitable means such as a sliding cutter blade 92 is positioned for sliding movement on the slideway 24 across the opening 84 of the cylinder 48, which blade may be operated by solenoid mechanism or the like 94 to reciprocate the blade in a manner to cut off pieces of the extruded material as the same passes downwardly through the opening 44 and an opening 45 in the wall 30 in registration therewith.

Below the slideway 24 a downwardly sloping conveyor plate or chute 96 is disposed in position to receive the pieces of extruded food material as they are cut off, the lower end 98 of this chute being positioned to deliver such pieces into an open cylinder 100 providing an opening through a hood or cover 102 located above the cooling and delivering mechanism 28.

The lower end 98 of chute 96 is preferably positioned in spaced relation to the wall of the opening 100, so that crumbs or fragments of the extruded material may fall through between the chute and cylinder 100 onto a sloping portion 104 of the hood 102, while whole pieces of the extruded material will bridge the gap to fall through the cylinder.

The cooking and delivering mechanism 28 is located beneath the hood 102, from whence heat and any fumes resulting from the cooking may pass out of the housing through suitable louvered openings 106 therein, and this mechanism includes a horizontal base plate 108, slidably supported in the housing, in any well known manner, as by means of angle tracks, not shown, attached to the walls of the housing, to permit the entire cooking and delivering mechanism to be removed as a unit from the housing for purposes of cleaning or the like.

A trough or tank 110, having a vertical wall 112, of spiral shape is carried by the base plate, which is partially filled with a suitable material, such as vegetable oil, which may be circulated through the tank and through a filter 114 of conventional design, as by means of a pump 116 whose inlet is connected in communication with the outlet of the filter by a pipe 118 and whose outlet is connected in communication with the tank at the inner end of the spiral wall 112 by a pipe 120 to return the filtered oil to the tank. The oil from the tank is conducted to the filter 114 through a pipe 122 which leads from the outer end of the tank to the inlet of the filter. By this arrangement oil is circulated in a spiral path through the tank and carries with it the food pieces which are supplied to the center of the tank.

Suitable means such as the electrical heating coils 124, of the usual type are provided beneath the tank 110 to heat the oil therein to the temperature required to properly cook the food.

At the outer end of the tank 110 means is provided for removing the food pieces from the oil, drawing the same and delivering the pieces to the exterior of the housing, such means in the present illustration, taking the form of an upwardly inclined link belt 126, or the like, which passes about a shaft 128 rotatably mounted in the tank adjacent the bottom thereof and about a shaft 130 rotatably mounted near the end wall 132 of the tank and somewhat above the same. The belt is operated by a suitable motor, shown at 134 which rotates the shaft 130.

A chute or inclined plate 136 is positioned with its upper end located to receive the food pieces deposited thereon by the belt 126 to deliver the pieces to the exterior of the housing through a suitable opening 138 therein.

Figure 8:
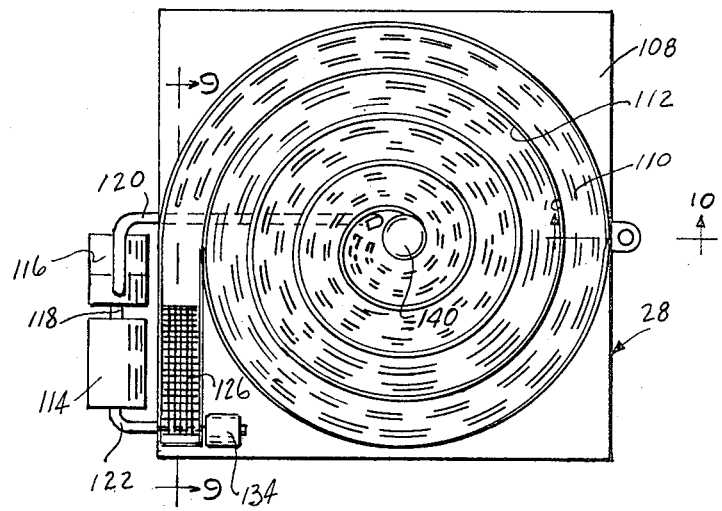
FIGURE 8 is a top plan view of a preferred form of the food cooking and delivering mechanism of the invention as illustrated in FIGURE 1.

At the center of the tank 110 a cone shaped element 140 extends upwardly from the bottom of the tank in position to be engaged by the food pieces falling into the tank through the cylinder 110, to assure that the pieces will all move outwardly along the spiral wall of the tank in a uniform manner and will not be trapped by eddy currents in the circulating oil. The spiral wall 112 of the tank terminates at its inner end in the upwardly tapering surface of the cone 140, as seen in FIGURE 8, whereby eddy currents in the oil are prevented at the location where the circulating oil enter the tank and where the food pieces fall into the oil, so that the pieces will be moved at a uniform rate toward the outer end of the tank in response to the circulation of the oil therethrough.

Figure 10:
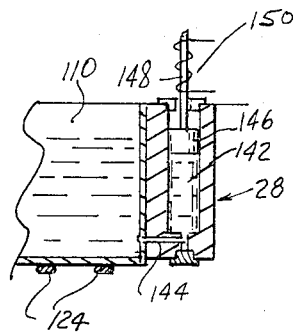
FIGURE 10 is a fragmentary detail view, on an enlarged scale, showing details of structure of the food cooking mechanism and the oil level indicator thereof.

Suitable means, such as that shown in FIGURE 10 is provided for indicating the level of the oil in the tank 110, comprising a plunger 146 positioned in a vertically disposed cylinder 142, whose lower end is in communication with the interior of the tank through a pipe 144. The piston 146 has a rod 148 of magnetic material, forming a core which extends into an electrical coil 150, whereby the position of the piston may be indicated on a meter in a well known manner.

Figure 9:
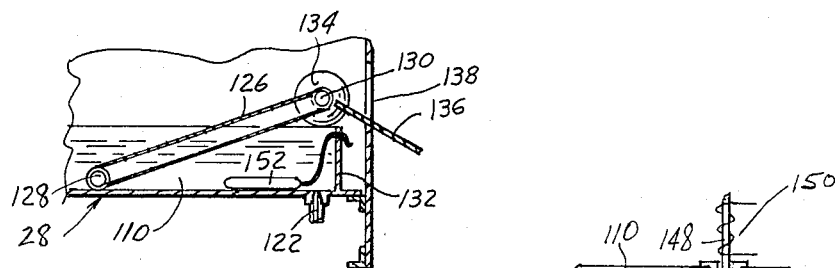
FIGURE 9 is an enlarged cross-sectional view, taken along the line 9—9 of FIGURE 8, looking in the direction indicated by the arrows, showing details of structure of the food cooking and delivering mechanism.

A temperature indicator, of any suitable type, such as that shown at 152 in FIGURE 9, is positioned in the oil in the tank 110 to indicate the temperature of the oil.

The instrument and control panel 12 is provided with various meters, such as the oil level indicating meter 154, a liquid level indicator 156 for the liquid reservoir 18, a meter 158 showing the amount of food material in the hopper 14 and an oil temperature indicating meter 160, all of which may be of a usual type.

The operation of the mechanism may be controlled by various electrical circuits, not shown, under the control of switches located on the control panel 12, whereby the mixing, extruding and cooking operation may be carried out automatically.

Figure 1:
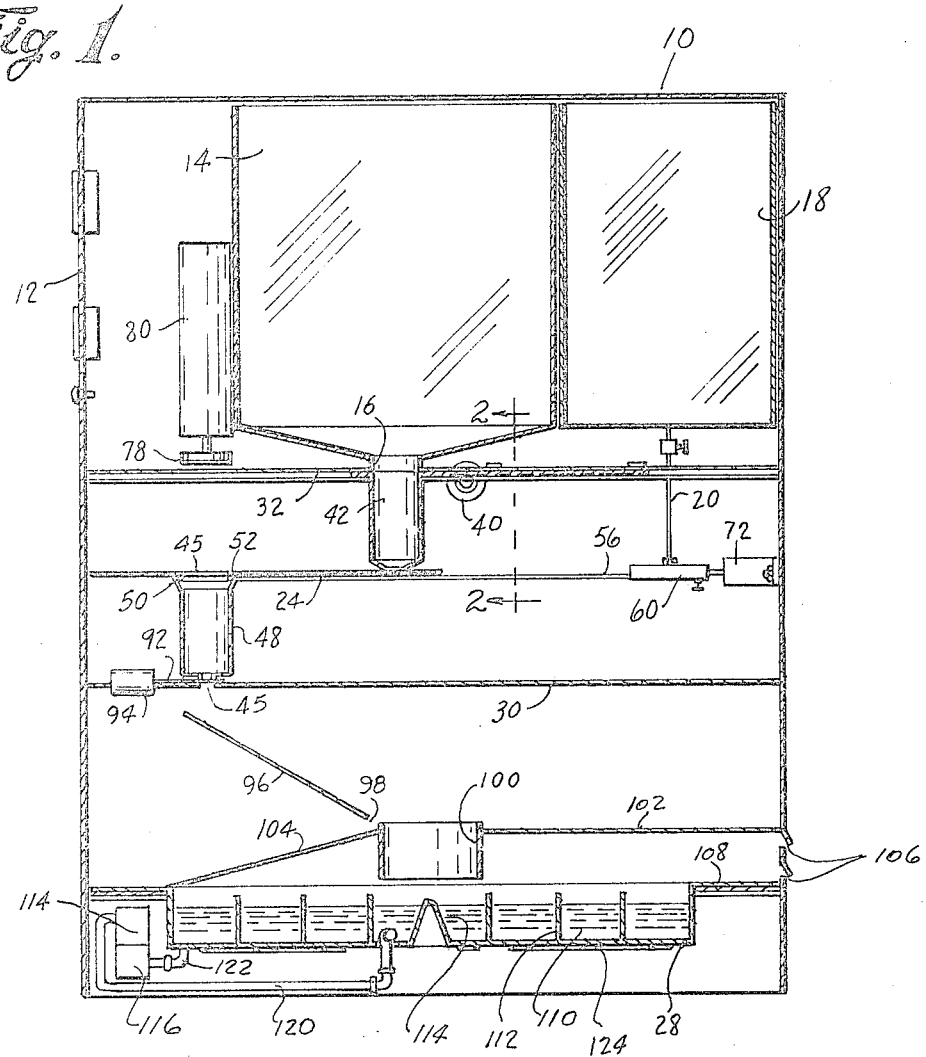
FIGURE 1 is a vertical, central, cross-sectional view, on a reduced scale, of a preferred embodiment of the invention showing the general arrangement and relationship of the various components of the machine, the same being shown in condition for the commencement of a food preparing, cooking and delivering operation.

In the operation of the equipment, constructed as described above, the receiver 42 will be loaded with particulate food material from the hopper 14, when the receiver is in the position shown in FIGURE 1, the amount of material so dispensed being determined by the size and capacity of the receiver, which may be predetermined. Upon operation of the motor 40, the receiver, thus loaded will be moved along the slide way 24 to a position over the opening 46, to allow the material to flow downwardly into the extruder cylinder 48. As the receiver moves away from the outlet 16 of the hopper the slide plate 34 will close the outlet 16 against any outflow of material from the hopper.

During the flow of material from the receiver into the extruder, the pump 60 will be operated by the solenoid 72 to discharge liquid, which may be water or some other desired liquid, through the spray ring 52 into the particulate material to wet the same, to form a uniformly moistened mass in the extruder, whereupon the receiver 42 is moved back by reverse operation of the motor 40 to its starting position beneath the hopper to be reloaded, and the pump 60 is operated by solenoid 72 to recharge the pump.

The operation of the pump 60 will be regulated by the valve 76 so that the liquid will be sprayed into the particulate material continuously as the material is discharged into the extruder, thus assuring uniform moistening of the material to form an extrudable mass, capable of forming, more or less firm, self sustaining pieces to be cooked.

With the extruder thus charged, the pressure cylinder 80 is operated to extend the plunger 78 into the extruder cylinder 48, through the spray ring 52, to extrude the paste-like mass through the bottom opening 84 of the cylinder. The cutting blade 92 will be reciprocated by the solenoid 94, during extrusion of the mass to cut the extruded material into pieces of predetermined length, which then fall upon the chute 96 from whence they pass downwardly through the cylinder 100 into the cooking tank 110, through which the hot oil is now being circulated. As the pieces fall into the oil they will be swept along individually at a uniform rate by the circulating oil, so that upon reaching the conveyor 126 the pieces will be cooked to the desired degree. During circulation of the oil in the tank, the central cone 114 will tend to prevent any eddy currents from being formed which might cause accumulation of the food pieces and prevent the same from moving at a uniform rate through the tank.

When the cooked food pieces reach the conveyor 126 they will be lifted by the conveyor from the oil, drained and deposited on the chute 136 to be discharged from the mechanism in a freshly cooked condition.

When the plunger 78 reaches the bottom of the extruder cylinder 48, the sealing means 82 thereof will be extended into the outlet opening 84, as seen at 86 in FIGURE 6, so that substantially all of the moistened mass will be extruded, the inside of the cylinder 48 being wiped clean and the opening 84 being cleared. The plunger 78 will then be retracted preparatory to another extruding operation.

A somewhat different form of the extruder mechanism of the invention is illustrated in FIGURES 3 and 4, wherein the extruder has a cylindrical upper end portion 48', similar to that of the cylinder 48, previously described. The portion 48' has attached to its lower end a horizontally extending tubular casing 162 within which a conveyor screw 164 is rotatably mounted. At its discharge end the casing 164 has an end plate 166 formed with an opening 168 through which the material to be extruded passes. The screw 164 has a shaft 170 which projects beyond the end plate 166 and upon which a blade 172 is mounted for rotation with the shaft to cut off pieces of material extruded through the opening. At the opposite end of the casing 162 the screw 164 has a shaft 174 to which a motor 176, supported on the casing, is connected to rotate the screw. By this arrangement the paste-like mass in the extruder is forced out of the opening 168 and cut by the blade into pieces of predetermined size to be cooked.

It will, of course, be apparent that the operation of the various movable components of the mechanism may be suitably coordinated to dispense and moisten the food material, extrude and cut the same and cook and deliver the pieces in a freshly cooked condition automatically without the need for manual manipulation of the equipment.

It will thus be seen that the invention provides mechanism for the mixing, extruding, cooking and delivering of food products in a freshly cooked condition, which is automatic in operation and easily maintained in sanitary condition.

The invention is disclosed herein in connection with a particular construction and arrangement of the parts, which it will be understood is intended by way of illustration only, the mechanism being capable of modification within the spirit of the invention and the scope of the appended claims.

Having thus clearly shown and described the invention, what is claimed as new and desired to secure by Letters Patent is:

1. In apparatus for preparing a cooked food product from dry, particulate food material, a receptacle having an inlet opening and a discharge outlet, means for introducing dry, particulate food material into said receptacle through said opening, means for introducing a liquid into said material during the introduction of the material into the receptacle to form a paste-like mass therein, means for applying pressure to said mass at a location to extrude the mass through said outlet and means for cutting the extruded mass into pieces as the mass is extruded.

2. The apparatus as claimed in claim 1 including means for cooking said pieces.

3. The apparatus as claimed in claim 1 wherein said means for introducing liquid into said material includes spray forming means surrounding said opening and said means for applying pressure to said mass includes plunger means movable into and out of the receptacle through said spray forming means.

References Cited

UNITED STATES PATENTS

| | | | |
|---|---|---|---|
| 1,390,008 | 9/1921 | Arduino | 99—289 X |
| 2,025,685 | 12/1935 | Hunter | 99—404 |
| 2,463,112 | 3/1949 | Kipnis | 99—404 |
| 2,926,597 | 3/1960 | Porambo | 99—405 X |

ROBERT W. JENKINS, *Primary Examiner.*